US011623287B2

United States Patent
Jäger et al.

(10) Patent No.: US 11,623,287 B2
(45) Date of Patent: Apr. 11, 2023

(54) ROTARY CUTTING TOOL

(71) Applicant: Kennametal Inc., Latrobe, PA (US)

(72) Inventors: Horst Manfred Jäger, Nuremberg (DE); Berthold Heinrich Zeug, Fuerth (DE)

(73) Assignee: Kennametal Inc., Latrobe, PA (US)

( * ) Notice: Subject to any disclaimer, the term of this patent is extended or adjusted under 35 U.S.C. 154(b) by 136 days.

(21) Appl. No.: 17/112,483

(22) Filed: Dec. 4, 2020

(65) Prior Publication Data
US 2021/0170505 A1   Jun. 10, 2021

(30) Foreign Application Priority Data
Dec. 5, 2019   (DE) .......................... 102019133212.5

(51) Int. Cl.
*B23B 51/02* (2006.01)
*B23C 5/22* (2006.01)

(52) U.S. Cl.
CPC ............... *B23C 5/22* (2013.01); *B23B 51/02* (2013.01)

(58) Field of Classification Search
CPC . B23B 51/02; B23B 2251/02; B23B 2251/50; B23B 31/06; B23B 31/07; B23B 31/1075; B23C 5/22; Y10T 408/90993
See application file for complete search history.

(56) References Cited

U.S. PATENT DOCUMENTS

| | | | | |
|---|---|---|---|---|
| 5,957,631 A | * | 9/1999 | Hecht | ..................... B23B 51/00 |
| | | | | 408/230 |
| 6,012,881 A | * | 1/2000 | Scheer | ................... B23B 31/008 |
| | | | | 408/233 |
| 7,972,094 B2 | | 7/2011 | Men et al. | |
| 8,142,116 B2 | | 3/2012 | Frejd | |
| 8,449,227 B2 | * | 5/2013 | Danielsson | ............. B23B 51/02 |
| | | | | 408/233 |
| 8,534,966 B2 | | 9/2013 | Hecht | |
| 8,882,413 B2 | | 11/2014 | Hecht | |
| 9,028,180 B2 | * | 5/2015 | Hecht | ..................... B23B 51/02 |
| | | | | 408/230 |
| 9,156,095 B2 | | 10/2015 | Harif | |
| 9,468,979 B2 | * | 10/2016 | Hecht | ................... B23B 31/113 |
| 2002/0168239 A1 | * | 11/2002 | Mast | ...................... B23B 51/02 |
| | | | | 408/233 |
| 2003/0091403 A1 | * | 5/2003 | Lindblom | ............... B23B 51/02 |
| | | | | 408/230 |
| 2005/0186042 A1 | * | 8/2005 | Hansson | ................. B23B 51/02 |
| | | | | 408/231 |

(Continued)

FOREIGN PATENT DOCUMENTS

WO   WO2013150516   10/2013

*Primary Examiner* — Nicole N Ramos
(74) *Attorney, Agent, or Firm* — Christopher J. Owens

(57) ABSTRACT

A rotary cutting tool, in particular a drill, is described, which comprises a shank and an exchangeable cutting tip (14). For this purpose, a locking geometry having an undercut of a first type and a torque transmission geometry is provided on the shank. A locking projection having a torque transmission counter-geometry is provided on the cutting tip, wherein, in a mounted state, the locking projection engages in the undercut of the first type and the torque transmission counter-geometry abuts the torque transmission geometry. The rotary cutting tool further comprises a securing unit, which holds the cutting tip on the shank.

12 Claims, 5 Drawing Sheets

(56) References Cited

U.S. PATENT DOCUMENTS

| | | | |
|---|---|---|---|
| 2005/0232716 A1* | 10/2005 | Brink | B23B 51/02 408/231 |
| 2005/0271890 A1* | 12/2005 | Koecher | B23K 35/3006 428/615 |
| 2006/0093449 A1* | 5/2006 | Hecht | B23B 51/02 408/231 |
| 2008/0193237 A1* | 8/2008 | Men | B23B 51/02 408/232 |
| 2010/0143059 A1* | 6/2010 | Hecht | B23B 51/02 408/230 |
| 2011/0110739 A1* | 5/2011 | Frisendahl | B23B 31/1076 408/200 |
| 2012/0121347 A1* | 5/2012 | Osawa | B23B 51/02 408/199 |
| 2012/0148358 A1* | 6/2012 | Hecht | B23B 51/02 408/229 |
| 2012/0155978 A1* | 6/2012 | Osawa | B23B 51/02 408/200 |
| 2012/0230787 A1* | 9/2012 | Harif | B23B 51/02 408/239 R |
| 2012/0315101 A1* | 12/2012 | Osawa | B23B 51/02 408/226 |
| 2014/0017022 A1* | 1/2014 | Schwaegerl | B23B 51/00 408/231 |
| 2014/0301799 A1* | 10/2014 | Schwaegerl | B23B 51/02 408/239 R |
| 2015/0360300 A1* | 12/2015 | Hecht | B23B 51/02 408/231 |
| 2017/0100784 A1* | 4/2017 | Frota de Souza Filho | B23B 51/06 |
| 2018/0264558 A1* | 9/2018 | Jäger | B23B 51/02 |
| 2020/0180047 A1* | 6/2020 | Jager | B23B 31/1075 |

* cited by examiner

1

ROTARY CUTTING TOOL

RELATED APPLICATION DATA

The present application claims priority pursuant to 35 U.S.C. § 119(a) to German Patent Application Number 102019133212.5, filed Dec. 5, 2019 which is incorporated herein by reference in its entirety.

FIELD

The present application relates to rotary cutting tools.

BACKGROUND

The invention relates to a rotary cutting tool, in particular a drill, having a shank, which can rotate about an axis of rotation, and an exchangeable cutting tip, which can be coupled to the shank, wherein a locking geometry having an undercut of a first type and a torque transmission geometry is provided on the shank, wherein the undercut of the first type acts against an axial pull-out direction and the torque transmission geometry is oriented in a direction of rotation, wherein a locking projection having a torque transmission counter-geometry is provided on the cutting tip and wherein, in a mounted state, the locking projection engages in the undercut of the first type and the torque transmission counter-geometry abuts the torque transmission geometry.

Such rotary cutting tools are already known from the state of the art. Typically, the objective is to ensure that the cutting tip can be mounted on the shank quickly and easily. At the same time, the cutting tip should be held reliably on the shank in its mounted state. These two requirements are obviously contradictory, so that in known rotary cutting tools it is always necessary to find a compromise between easy mountability and reliable hold.

SUMMARY

The object of the invention is therefore to provide a rotary cutting tool, in which the cutting tip can be mounted on the shank quickly and easily and also held reliably on the shank in the mounted state. It should in particular be possible to change the cutting tip "from the front". The end of the rotary cutting tool on the clamped side should therefore not have to be accessible in order to change the cutting tip.

The object is achieved by a rotary cutting tool of the abovementioned type, which is provided with a securing unit that holds the cutting tip on the shank in the mounted state. In such a rotary cutting tool, the cutting tip is mounted on the shank by assuming a first rotational position relative to the shank and being axially inserted into a receiving pocket on the shank in a first step. In a second step, the cutting tip is rotated relative to the shank such that the locking projection engages with the undercut of the first type. At the same time, the torque transmission counter-geometry is placed against the torque transmission geometry. Thus, during operation of the rotary cutting tool, a torque can be transmitted from the shank to the cutting tip in a planar manner. At the same time, the cutting tip is secured on the shank in axial direction by the undercut of the first type. The securing unit reinforces the axial hold of the cutting tip on the shank. The securing unit furthermore prevents the cutting tip from rotating relative to the shank in such a way that the locking projection disengages from the locking geometry. The cutting tip is consequently held particularly securely and reliably on the shank. The mounting thereof is nonetheless easy.

The effect of the securing unit can be friction-locking and/or form-locking.

The torque transmission geometry preferably comprises a flat torque transmission surface and/or a curved torque transmission surface. The torque transmission geometry can also consist of a plurality of flat or curved surface segments.

The same applies to the torque transmission counter-geometry. This therefore also preferably comprises a flat torque transmission countersurface and/or a curved torque transmission countersurface. The torque transmission counter-geometry can also consist of a plurality of flat or curved surface segments.

The locking projection can be set back relative to an axial, workpiece-side front side of the cutting tip. In other words, when viewing the cutting tip in radial direction, the locking projection can be set back relative to the front side in a stepped manner.

Preferably, at least two locking projections are disposed on the periphery of the cutting tip, which are in particular diametrically opposite to one another. Accordingly, two locking geometries are preferably provided on the shank as well. Three or four locking projections can alternatively be provided, along with a corresponding number of locking geometries on the shank.

The locking geometry can comprise an undercut of a second type which counteracts a lifting away of the torque transmission counter-geometry from the torque transmission geometry, wherein, in the mounted state, the locking projection engages in the undercut of the second type. The undercut of the second type thus form-lockingly prevents the cutting tip from rotating in a disassembling direction relative to the shank. This results in a reliable hold of the cutting tip on the shank in the mounted state. The undercut of the second type is designed such that the locking projection can easily be brought into engagement with it in the course of mounting.

According to one embodiment, the locking geometry comprises a base body and a holding finger, wherein the base body extends substantially axially with respect to the axis of rotation and wherein the holding finger starts at a cutting tip-side end of the base body, extends substantially in circumferential direction and projects in circumferential direction relative to the base body. This basic configuration of locking geometries has proven itself in the state of the art and is robust.

The undercut of the second type is preferably formed by the holding finger. The projecting section of the holding finger thus extends in both circumferential direction and in axial direction. Its axial component is oriented in the direction of the end of the shank on the clamped side. The undercut of the second type can thus easily be implemented. The dimensions of the undercut of the second type can be selected via the dimension of the axial component of the projecting section of the holding finger. This determines which mounting force is necessary to bring the locking projection into engagement with the undercut of the second type and, conversely, which holding force is produced by the undercut of the second type.

The undercut of the first type is likewise preferably formed by the holding finger. As already mentioned, the holding finger extends substantially in circumferential direction. The undercut of the first type is thus disposed on the axial side of the holding finger that faces the end of the shank on the clamped side. The undercut of the first type can thus easily be implemented.

In one variant, the securing unit comprises a loading means, by means of which the holding finger can be pressed axially against the locking projection in the mounted state. This results in a force-locking or friction-locking securing of the cutting tip on the shank, which in particular counteracts rotation of the cutting tip relative to the shank. If the locking projection is disposed in an undercut of the second type, the loading means also reinforces the form-locking hold produced by the undercut of the second type. The reason for this is that the loading means prevents the locking projection from overcoming the holding effect of the undercut of the second type, for example by deforming elastically.

The loading means can comprise a clamping screw, by means of which the holding finger can be loaded with pressure in the direction of the base body such that the locking projection is clamped axially between the holding finger and an axial stop surface on the shank. The clamping screw thus at least causes the holding finger and the locking projection to abut one another under preloading. The holding finger can also deform elastically in the direction of the locking projection. This results in a particularly reliable hold of the cutting tip on the shank.

Alternatively, the loading means is a clamping disc, which is disposed between the cutting tip and the shank such that, in the mounted state of the cutting tip, the holding finger is axially pressed against the locking projection. The clamping disc is in particular located axially between the cutting tip and a base of a receiving pocket on the shank provided for this cutting tip. Strictly speaking, therefore, the locking projection is located in axial direction between the clamping disc and the section of the locking geometry that forms the undercut of the first type, in particular the holding finger. Two effects can be achieved via the clamping disc, which either occur individually or in combination. On the one hand, the clamping disc can be used to compensate any tolerances that may exist on the shank and/or on the cutting tip, such that the cutting tip comes into a defined abutment on the shank, in particular on the locking geometry, in particular in axial direction. On the other hand, a certain degree of elasticity can be introduced into the composite consisting of the locking projection and the locking geometry via the clamping disc. In particular the clamping disc is elastically deformed, preferably in axial direction. The locking projection is thus pressed against the holding finger starting from an end of the shank on the clamped side. This also results in a particularly reliable hold of the cutting tip on the shank.

The clamping disc can be positioned on a side of the cutting tip facing away from the holding finger and comprise at least one support geometry for positioning the cutting tip on the shank. The clamping disc is therefore disposed on a side of the cutting tip facing the end of the shank on the clamped side. Since the clamping disc can be produced within narrow tolerances, the support geometry can be used for precise positioning of the cutting tip on the shank. In this respect, the shank and in particular the locking geometry provided on it, as well as the cutting tip, can in particular be produced within comparatively rough tolerances. These tolerances can then be compensated by the clamping disc.

A first support geometry facing the shank and a second support geometry facing the cutting tip are preferably different. The support geometries are in particular not congruent. This makes it possible to achieve an improved transmission of a torque from the cutting tip to the shank and vice versa. The first support geometry comprises a curved support surface, for example, which reduces bending stresses in the area of the locking geometry that result from torque during operation of the rotary cutting tool. The second support geometry can comprise a flat support surface that cooperates with the cutting tip. A corresponding flat surface on the cutting tip can be produced comparatively easily and precisely. Furthermore, even if torque peaks occur during operation of the rotary cutting tool, the cutting tip is reproducibly supported over its entire surface on the second support geometry.

The clamping disc is advantageously a component separate from the shank and the cutting tip, in particular wherein the clamping disc is exchangeable. The clamping disc can thus be produced separately from the shank and the cutting tip. This makes it possible to observe different tolerances when producing the clamping disc than when producing the shank and/or cutting tip. A different material can thus also be selected for the clamping disc than for the shank and/or the cutting tip. This makes it easy to achieve the effects of tolerance compensation and elasticity that have already been discussed.

In an alternative embodiment, the securing unit comprises a securing pin. On the cutting tip there is also an opening that is associated with the securing pin, wherein the securing pin extends axially from the shank and, in the mounted state of the cutting tip, engages in the opening. The cutting tip is thus additionally secured to the shank.

The securing pin can comprise a pin shank and a pin head, and the opening can be provided with an undercut of a third type. The undercut of the third type acts axially and the pin head is disposed inside the opening in a first rotational position of the cutting tip relative to the securing pin and engages in the undercut of the third type in order to secure the cutting tip against an axial pull-out direction on the shank. The undercut of the third type secures the cutting tip axially on the shank in cooperation with the securing pin. The first rotational position preferably coincides with a relative position of the cutting tip to the shank, in which the torque transmission geometry abuts the torque transmission counter-geometry. This results in a reliable securing of the cutting tip on the shank.

In the first rotational position, an outer surface of the pin head and/or an outer surface of the pin shank can additionally abut an associated outer surface of the opening, in particular be in a friction-locking connection with it. The cutting tip is thus also secured against unwanted rotation.

The pin head preferably has an oval cross-section and the opening of the cutting tip comprises a feed section which is designed with a corresponding oval cross-section. The pin head can thus be inserted axially into the opening in a second rotational position, wherein the second rotational position differs from the first rotational position. The pin head can thus easily be pushed through the feed section in axial direction. In the direction of the point of the cutting tip, the feed section is followed by an end section which forms the undercut of the third type. For this purpose, the end section has a diameter that exceeds the diameter of the feed section, at least in sections. By rotating the cutting tip relative to the pin head from the second rotational position into the first rotational position, it can engage with the end section, i.e. with the undercut of the third type. This results in a reliable securing of the cutting tip on the shank.

The securing pin can consist of two securing pin halves which are separated by an axial gap. The securing pin halves are elastically deformable in a radial direction. The securing pin can thus be clamped inside the opening by means of a radially acting spring force which results from the elastic formability. This results in a friction-locking securing of the cutting tip against rotation on the shank.

In one embodiment, in which the securing unit comprises a securing pin, the cutting tip is mounted on the shank as follows. First, the cutting tip is brought into the second rotational position relative to the shank. The securing pin and in particular the pin head is then pushed axially into the feed section of the opening until the cutting tip abuts an axial base of the receiving pocket on the shank provided for it. The pin head is then located in the end section of the opening, but does not yet engage in the undercut of the third type. The cutting tip is then moved into the first rotational position relative to the shank. This causes the pin head to engage in the sections of the end section of the opening that have diameters which exceed the diameter of the feed section. In other words, the pin head engages with the axially acting undercut of the third type. To remove the cutting tip from the shank, the aforementioned steps are performed in reverse order and direction.

BRIEF DESCRIPTION OF THE DRAWINGS

The invention is explained below with the aid of different design examples, which are shown in the accompanying drawings. The figures show.

DETAILED DESCRIPTION

Figure 1:
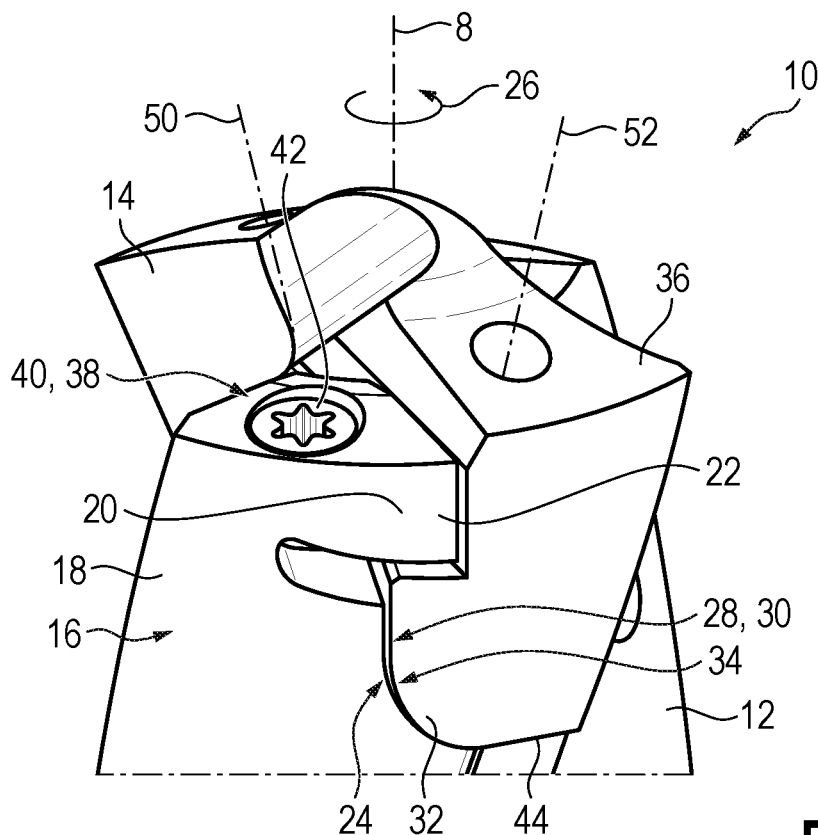
FIG. 1 a rotary cutting tool according to the invention according to a first embodiment in the form of a drill, FIG. 2 a shank of the rotary cutting tool of FIG. 1 in an isolated illustration, FIG. 3 a cutting tip of the rotary cutting tool of FIG. 1 in an isolated illustration, FIG. 4 a rotary cutting tool according to the invention according to a second embodiment in the form of a drill, FIG. 5 the rotary cutting tool of FIG. 4 during a mounting procedure, FIG. 6 a shank and a clamping disc of the rotary cutting tool of FIGS. 4 and 5 mounted on said shank in an isolated illustration, FIG. 7 the clamping disc of the rotary cutting tool of FIGS. 4 to 6 in an isolated illustration, FIG. 8 a rotary cutting tool according to the invention according to a third embodiment in the form of a drill during a mounting procedure in a perspective front view, and FIG. 9 the rotary cutting tool of FIG. 8 in a perspective rear view.
Figure 2:
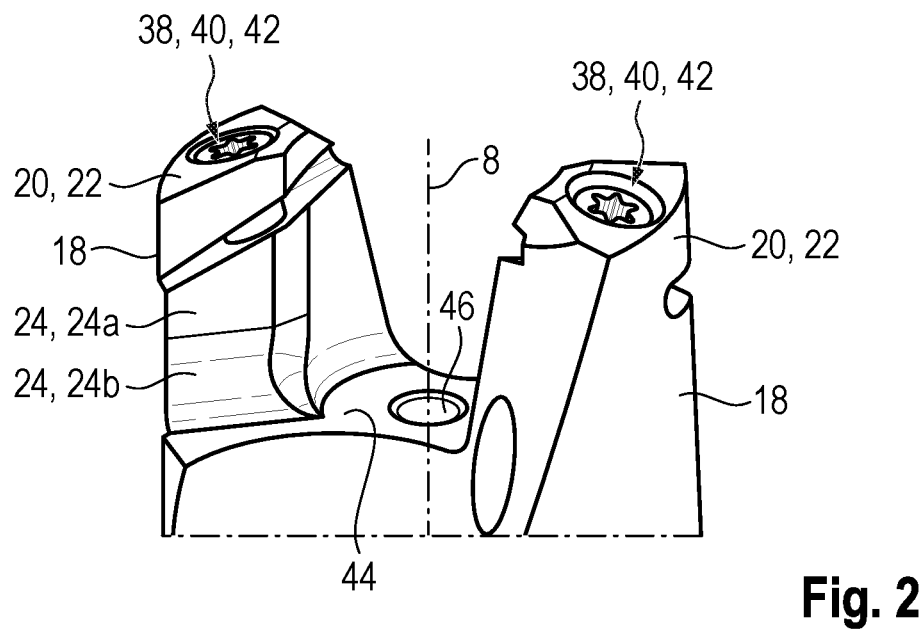
Figure 3:
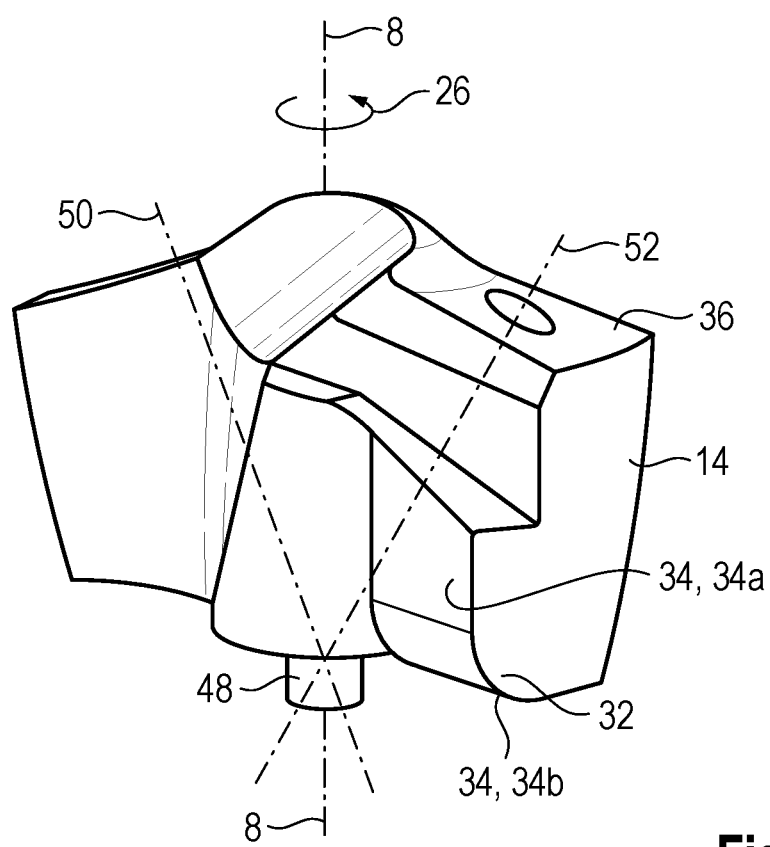
Figure 4:
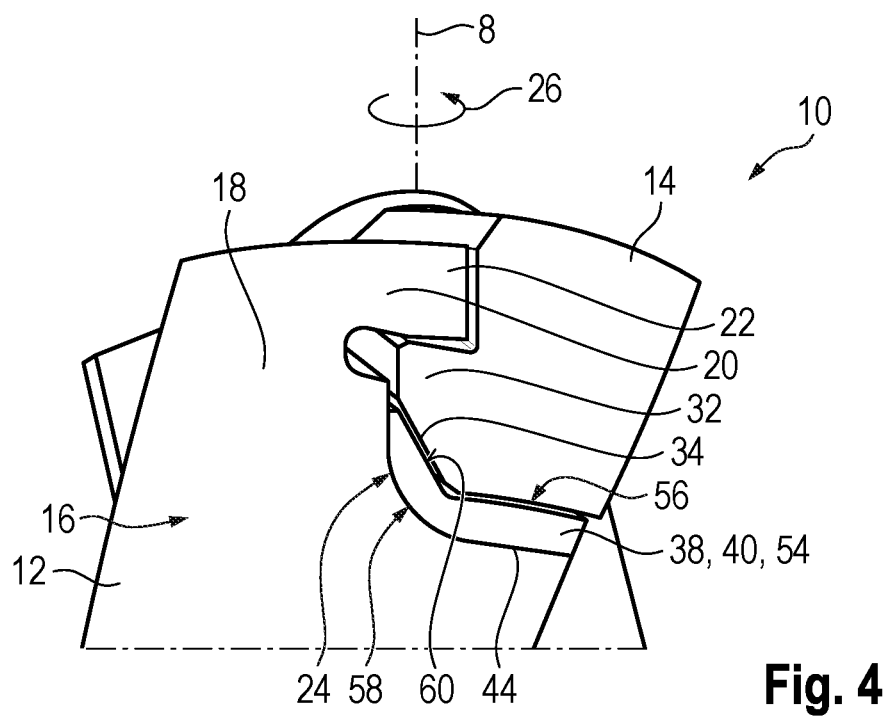
Figure 5:
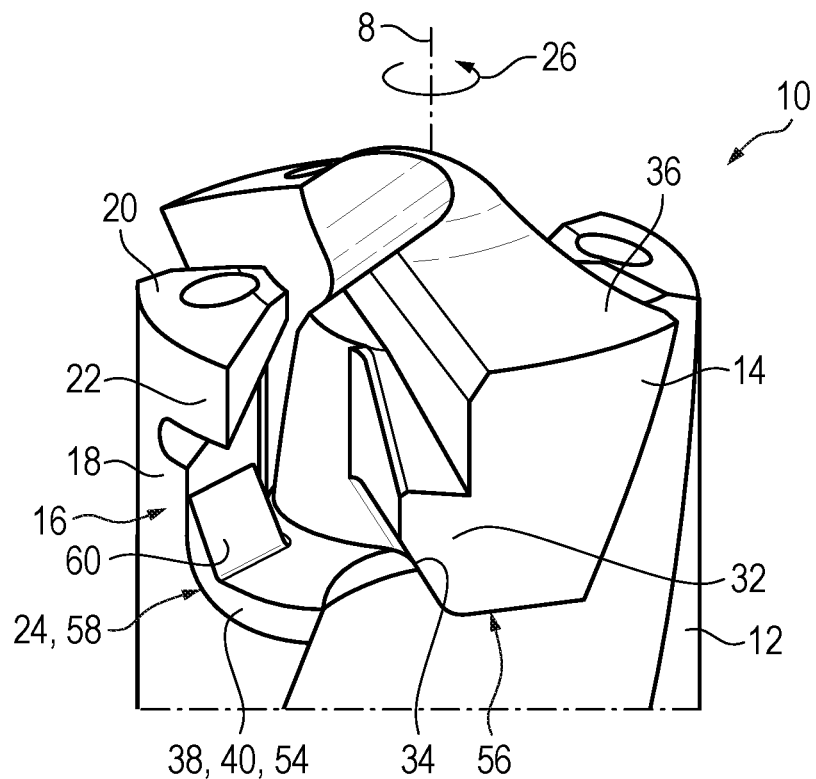
Figure 6:
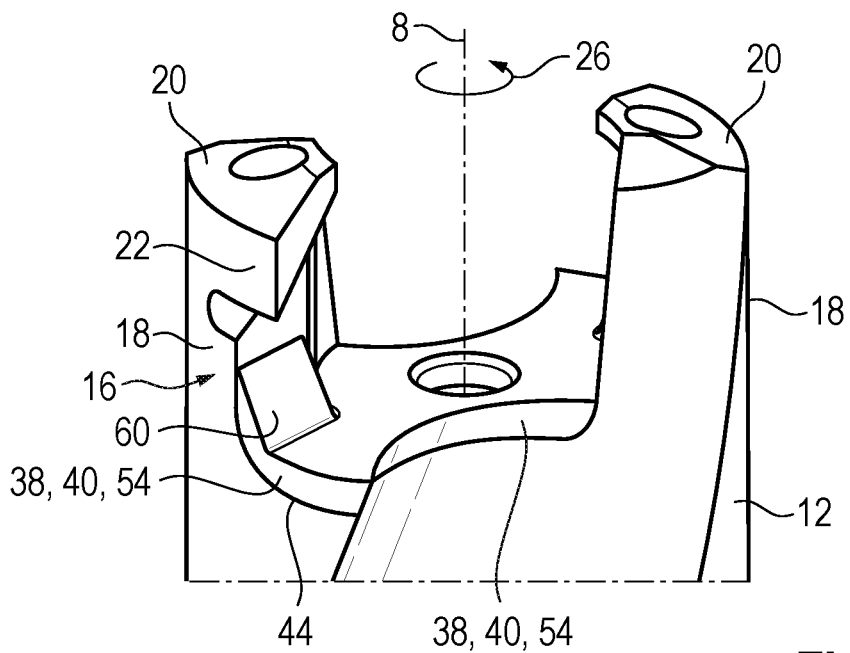
Figure 7:
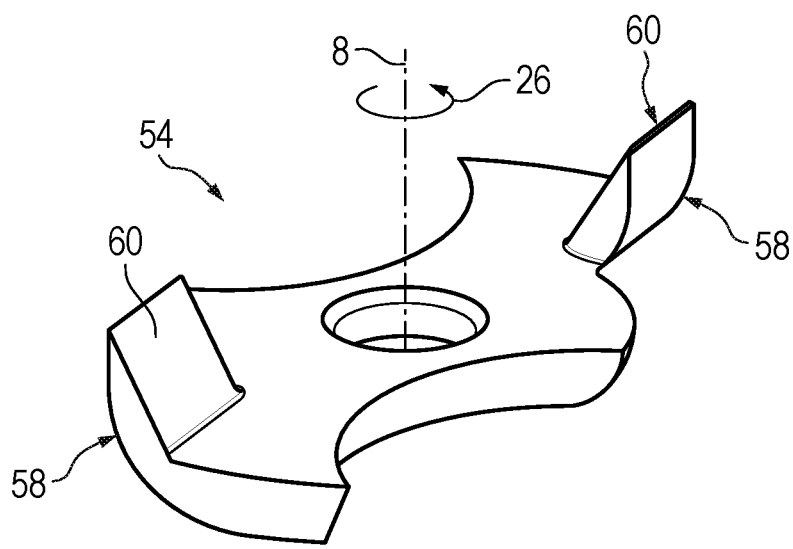

FIGS. 1 to 3 show a rotary cutting tool 10 according to a first embodiment. The rotary cutting tool 10 is designed as a drill, which can be rotated about an axis of rotation 8.

It comprises a shank 12, which is shown only in sections in FIG. 1, and a cutting tip 14 that is coupled to it in an exchangeable manner.

For this purpose, a locking geometry 16 is provided on the shank 12.

It comprises a base body 18, which extends substantially axially, i.e. along the axis of rotation 8.

In addition to this, a holding finger 20 extends from a cutting tip-side end of the base body 18. Said holding finger extends substantially in circumferential direction relative to the axis of rotation 8 and projects relative to the base body 18. The holding finger 20 thus comprises a projecting section 22.

In addition to this, the locking geometry 16 comprises a torque transmission geometry 24, which is oriented in a direction of rotation 26 of the rotary cutting tool 10 about the axis of rotation 8.

In the embodiment shown, the torque transmission geometry 24 consists of a flat torque transmission surface 24a and a curved torque transmission surface 24b (see FIG. 2).

The holding finger 20, more precisely the projecting section 22 of the holding finger 20, further forms an undercut 28 of a first type, which acts against an axial pull-out direction, i.e. along the axis of rotation 8.

The projecting section 22 of the holding finger also forms an undercut 30 of a second type, which counteracts a rotation of the cutting tip 14 relative to the shank 12 in the direction of rotation 26.

The cutting tip 14 is provided with a locking projection 32, which comprises a torque transmission counter-geometry 34. This is oriented against the direction of rotation 26.

Corresponding to the torque transmission geometry 24, the torque transmission counter-geometry 34 consists of a flat torque transmission countersurface 34a, which has a surface normal that is oriented substantially in circumferential direction, and a curved torque transmission countersurface 34b (see in particular FIG. 3).

The locking projection 32 is set back relative to an axial front side 36 of the cutting tip along the axis of rotation 8 and thus forms a step.

In the mounted state of the rotary cutting tool 10, the locking projection 32 of the cutting tip 14 engages both in the undercut 28 of the first type and in the undercut 30 of the second type.

The torque transmission counter-geometry 34 furthermore abuts the torque transmission geometry 24.

The cutting tip is secured against unwanted relative rotation with respect to the shank 12 in the direction of rotation 26 by the undercut 30 of the second type. The undercut 30 of the second type thus also counteracts a lifting away of the torque transmission counter-geometry 34 from the torque transmission geometry 24.

Axial withdrawal of the cutting tip 14 from the shank 12 is prevented by the axially effective undercut 28 of the first type.

A securing unit 38 is provided as well, which, in the mounted state, holds the cutting tip 14 on the shank 12.

In the embodiment shown, this securing unit 38 comprises a loading means 40, by means of which the holding finger 20 is pressed axially against the locking projection 32 in the mounted state.

The only thing that matters is the relative relationship of the holding finger 20 to the locking projection 32, so that the locking projection 32, too, is pressed against the holding finger 20 by the loading means 40.

In the first embodiment, the loading means 40 is a clamping screw 42.

The holding finger 20 can be loaded with pressure in the direction of the base body 18 by the clamping screw 42 in such a way that the locking projection 32 is clamped axially between the holding finger 20 and an axial stop surface 44 on the shank 12.

The stop surface 44 represents a bottom surface of the locking geometry 16.

The rotary cutting tool 10 is furthermore provided with coolant channels. The shank 12 comprises a central supply channel 46, which extends substantially along the axis of rotation 8.

The cutting tip 14 is furthermore provided with a connecting pin 48 for the coolant supply, which also extends substantially along the axis of rotation 8. Two outlet lines 50, 52 branch off from this in a forked manner and are depicted in FIGS. 1 and 3 with associated center lines. The coolant can be conducted into a machining zone via the outlet lines 50, 52.

Mounting the cutting tip 14 on the shank 12 proceeds as follows.

First, the cutting tip 14 is brought into a rotational position relative to the shank 12, in which it can be pushed past the projecting section 22 of the holding finger 20 into the locking geometry 16. It is thus moved along the axis of rotation 8 until it abuts the stop surface 44. As a result, the connecting pin 48 is also pushed into an end section of the supply channel 46 and thereby coupled to it in a coolant-conducting manner.

The cutting tip 14 is then rotated relative to the shank 12 against the direction of rotation 26 until the torque transmission geometry 24 and the torque transmission counter-geometry 34 abut one another.

This also causes the locking projection 32 to engage with the undercut 28 of the first type and the undercut 30 of the second type.

The clamping screw 42 is then tightened so that the holding finger 20 deforms elastically in the direction of the base body 18. As a result, the holding finger 20 clamps the locking projection 32 against the stop surface 44.

The cutting tip 14 is thus reliably held on the shank 12. The outlet lines 50, 52 can now also be supplied with coolant via the supply channel 46 in the shank 12.

To remove the cutting tip 14 from the shank 12 again, the described mounting steps need only be carried out in reverse order and with reverse directions of movement.

FIGS. 4 to 7 show a second embodiment of the rotary cutting tool 10.

Only the differences to the first embodiment will be discussed. The same or corresponding components are therefore provided with the same reference signs.

As in the first embodiment, the rotary cutting tool 10 according to the second embodiment, too, is provided with a securing unit 38 which comprises loading means 40.

However, the loading means 40 is now a clamping disc 54.

This is a separate component from the shank 12 and the cutting tip 14.

In the mounted state of the rotary cutting tool 10, the clamping disc 54 is disposed between the cutting tip 14 and the shank 12. It is positioned on a side of the cutting tip 14 facing away from the holding finger 20.

In other words, the clamping disc 54 abuts the stop surface 44 of the shank 12 on the one hand, and an end surface 56 of the cutting tip 14 on the clamped side on the other hand.

The clamping disc 54 comprises a first support geometry 58 which, in the mounted state, abuts the torque transmission geometry 24. The clamping disc 54 is thus positioned on the shank 12 in the direction of rotation 26 via the first support geometry 58. In the embodiment shown, both the torque transmission geometry 24 and the first support geometry 58 are composed of a curved surface section and a flat surface section.

The clamping disc 54 further comprises a second support geometry 60 which, in the mounted state, abuts the torque transmission counter-geometry 34 of the cutting tip 14. The second support geometry 60 therefore helps to position the cutting tip 14 relative to the clamping disc 54 and thus overall to position the cutting tip 14 relative to the shank 12.

In the embodiment shown, the second support geometry 60 comprises a substantially flat support surface. The torque transmission counter-geometry 34 also comprises a substantially flat torque transmission countersurface.

Between the support geometries 58, 60 there is a support region, which supports the torque introduced by the shank 12 into the cutting tip 14. This is also the case for torques that are oriented in the opposite direction.

The clamping disc 54 presses the holding finger 20 axially against the locking projection 32. Once again, the only thing that matters is the interaction between the holding finger 20 and the locking projection 32, so that the locking projection 32 is also axially pressed against the holding finger 20.

The axial thickness of the clamping disc 54 in particular is dimensioned such that this pressing occurs.

The clamping disc 54 furthermore has a certain degree of elasticity. Compressing it between the cutting tip 14 and the shank 12 produces the force by means of which the holding finger 20 and the locking projection 32 are pressed against one another as an elastic reaction force.

The mounting of the cutting tip 14 on the shank 12 is essentially the same as in the first embodiment. The only difference is that, in a preceding step, i.e. before the cutting tip 14 is mounted on the shank 12, the clamping disc 54 is placed against the stop surface 44 and oriented in the direction of rotation 26 by placing the first support geometry 58 against the torque transmission geometry 24.

Of course, when mounting the rotary cutting tool 10 according to the second embodiment, there is also no tightening of the clamping screw 42.

In the rotary cutting tool 10 according to the second embodiment, it is also possible to use the same combination of shank 12 and cutting tip 14 with different clamping discs 54.

The different clamping discs 54 can be used to compensate for wear that occurs over the service life of the rotary cutting tool 10. Alternatively or additionally, the compressive force that exists between the holding finger 20 and the locking projection 32 can be influenced in a targeted manner by using different clamping discs 54.

Figure 8:
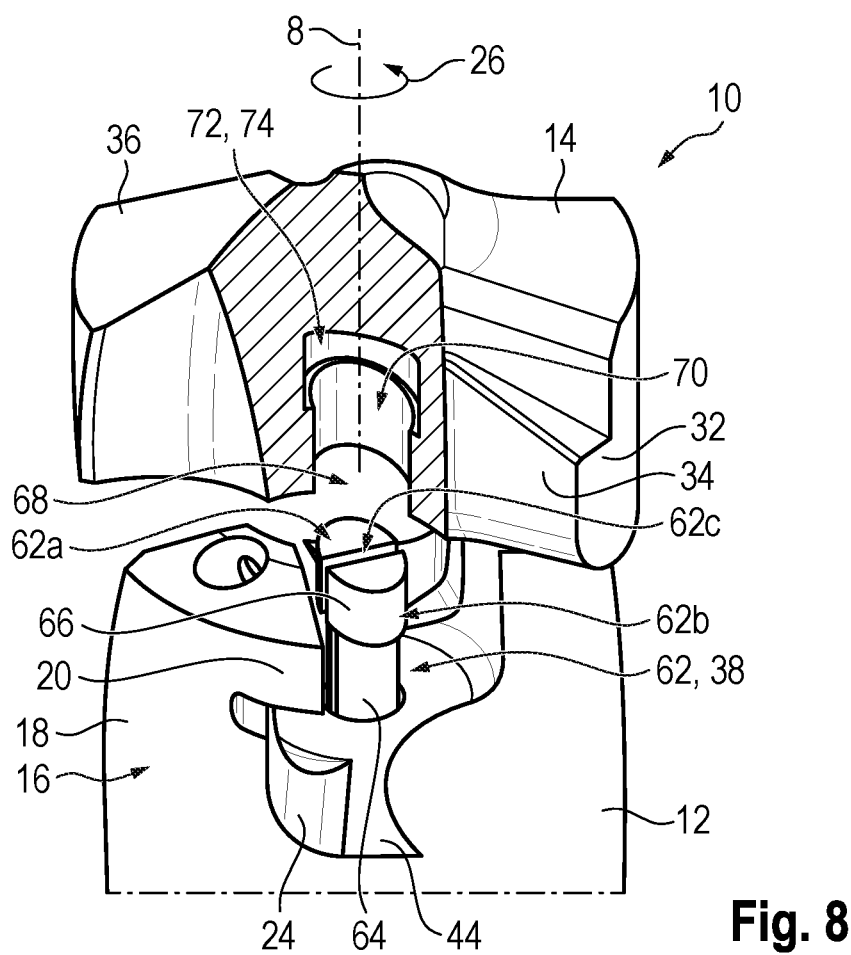
Figure 9:
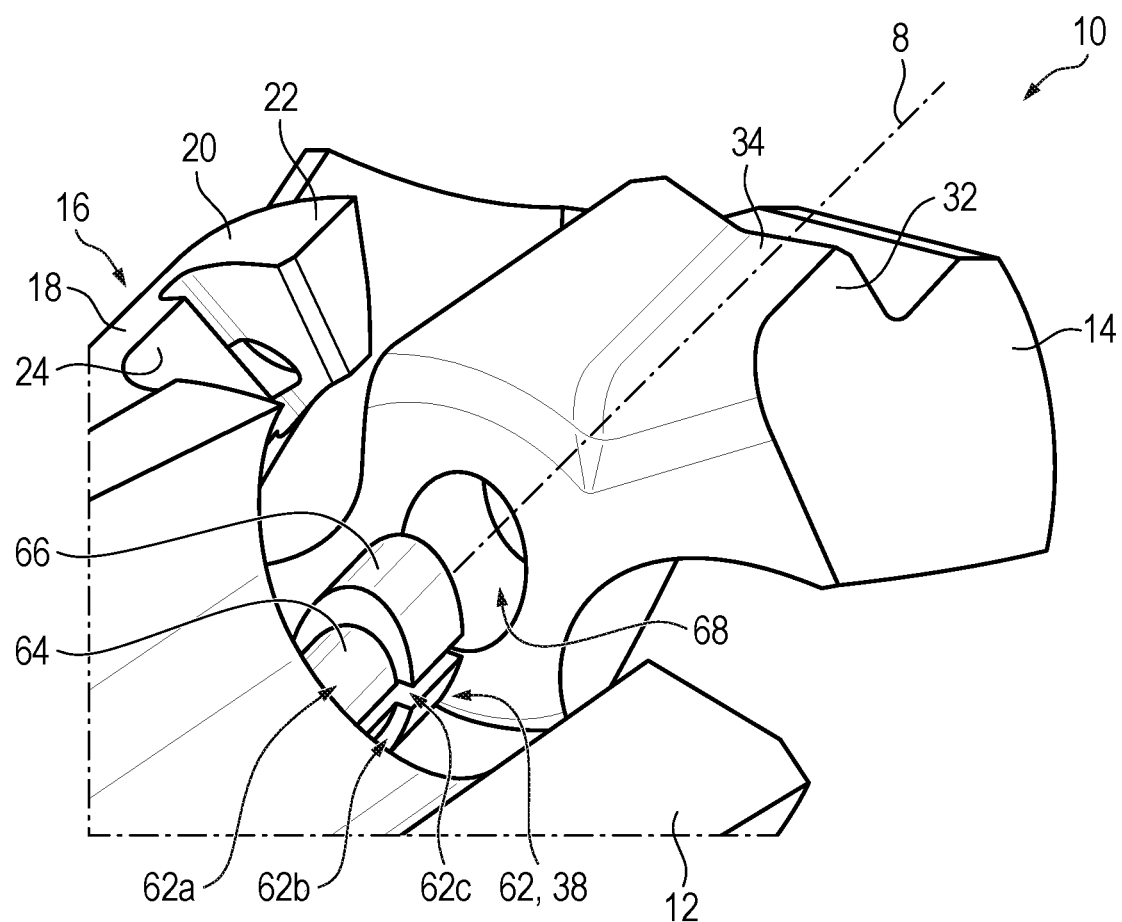

FIGS. 8 and 9 show a third embodiment of the rotary cutting tool 10. Again, only the differences to the two aforementioned embodiments will be discussed. Consequently, the same or corresponding components are again provided with the same reference signs.

In the rotary cutting tool 10 according to the third embodiment, the securing unit 38 comprises a securing pin 62.

Said pin comprises a pin shank 64 and an axially adjoining pin head 66.

The securing pin 62 extends substantially axially along the axis of rotation 8.

The securing pin 62 furthermore consists of two securing pin halves 62a, 62b. These are separated from one another by an axial gap 62c, which extends both through the pin shank 64 and through the pin head 66. The securing pin halves 62a, 62b are thus elastically deformable in a radial direction with respect to the axis of rotation 8.

The pin shank 64, including the axial gap 62c, has a substantially circular cross-section.

The pin head 66, on the other hand, has a substantially oval cross-section, the axial gap 62c again being included. The cross-section of the pin head 66 is configured such that it projects radially over the pin shank 64 on all sides.

An opening 68, which is assigned to the securing pin 62, is furthermore provided on the cutting tip 14. This, too, extends substantially along the axis of rotation 8.

The opening 68 comprises a feed section 70 and an end section 72. The end section 72 axially adjoins the feed section 70 in the direction toward the front side 36 of the cutting tip 14.

The feed section 70 has a substantially oval cross-section, which is configured such that the pin head 66 can be pushed through the feed section 70.

An axial length of the feed section 70 furthermore substantially corresponds to an axial length of the pin shank 64.

At least in sections, a cross-section of the end section 72 has a cross-section that is enlarged relative to the feed section 70.

The axial length of the end section 72 is substantially equal to an axial length of the pin head 66 or greater.

Therefore, at least in those regions in which the cross-section of the end section 72 radially exceeds the cross-section of the feed section 70, the end section 72 forms an undercut 74 of a third type relative to the feed section 70, which acts along the axis of rotation 8, i.e. axially.

In a mounted state of the rotary cutting tool 10, the securing pin 62 engages in the opening 68. In doing so, the pin head 66 engages behind the undercut 74 of the third type formed by the end section 72 and thus secures the cutting tip 14 on the shank 12.

Mounting the cutting tip 14 on the shank 12 proceeds as follows.

The securing pin 62 and the cutting tip 14 are first brought into a second rotational position, in which the cross-section of the pin head 66 and the cross-section of the feed section 70 are substantially congruent.

In this second rotational position, the securing pin 62 is inserted along the axis of rotation 8 through the feed section 70 into the opening 68. The cutting tip 14 then abuts the stop surface 44 of the shank 12.

The cutting tip 14 is then moved into a first rotational position by rotating it against the direction of rotation 26 relative to the shank 12. On the one hand, this brings the torque transmission geometry 24 into abutment with the torque transmission counter-geometry 34. On the other hand, the pin head 66 is rotated within the end section 72 such that it engages in the undercut 74 of the third type.

In addition, a peripheral surface of the pin head 66 is elastically placed against a peripheral surface of the end section 72 of the opening 68, for which the two securing pin halves 62a, 62b are elastically deformed radially inward. The cutting tip 14 and the securing pin 62 are thus also coupled in a friction-locking manner.

Overall therefore, the cutting tip 14 is reliably held on the shank 12.

The above embodiments of the rotary cutting tool 10 have been explained with the aid of a single locking geometry 16, which cooperates with a single locking projection 32 of the cutting tip 14. However, it goes without saying that, in all of the discussed embodiments, two such locking geometries 16 are provided, which are positioned diametrically opposite one another on the shank 12. The cutting tip 14 accordingly also comprises two associated locking projections 32.

The invention claimed is:

1. A rotary cutting tool comprising:
a shank having an axis of rotation;
an exchangeable cutting tip configured to be coupled to the shank,
wherein the shank includes a locking geometry comprising a base body extending axially along the axis of rotation and a holding finger extending from a cutting tip-side end of the base body in a circumferential direction relative to the base body, the holding finger having a projecting section forming a first undercut and a second undercut, the locking geometry further comprising a torque transmission geometry oriented in the direction of rotation and including a flat torque transmission surface and a curved torque transmission surface,
wherein the cutting tip includes a locking projection having a torque transmission counter-geometry comprising a flat torque transmission countersurface and a curved torque transmission countersurface,
wherein, in a mounted state, the locking projection of the cutting tip engages both the first undercut of the shank to prevent pull-out of the cutting tip from the shank along the axis of rotation and the second undercut of the shank to counteract rotation of the cutting tip relative to the shank in a direction of rotation and to counteract a lifting away of the torque transmission counter-geometry from the torque transmission geometry, and the torque transmission counter-geometry abuts the torque transmission geometry; and
loading means for holding the cutting tip on the shank, wherein the loading means comprises a clamping screw for elastically deforming the holding finger in the direction of the base body such that the locking projection of the cutting tip is clamped between the holding finger and an axial stop surface on the shank.

2. The rotary cutting tool of claim 1, wherein the rotary cutting tool comprises a drill.

3. A rotary cutting tool, comprising:
a shank having an axis of rotation;
an exchangeable cutting tip configured to be coupled to the shank,
wherein the shank includes a locking geometry comprising a base body extending axially along the axis of rotation and a holding finger extending from a cutting tip-side end of the base body in a circumferential direction relative to the base body, the holding finger having a projecting section forming a first undercut and a second undercut, the locking geometry further comprising a torque transmission geometry oriented in the direction of rotation and including a flat torque transmission surface and a curved torque transmission surface,
wherein the cutting tip includes a locking projection having a torque transmission counter-geometry comprising a flat torque transmission countersurface and a curved torque transmission countersurface,
wherein, in a mounted state, the locking projection of the cutting tip engages both the first undercut of the shank to prevent pull-out of the cutting tip from the shank along the axis of rotation and the second undercut of the shank to counteract rotation of the cutting tip relative to the shank in a direction of rotation and to counteract a lifting away of the torque transmission counter-geometry from the torque transmission geometry, and the torque transmission counter-geometry abuts the torque transmission geometry; and
loading means for holding the cutting tip on the shank, wherein the loading means comprises a clamping disc, which is disposed between the cutting tip and the shank such that, in the mounted state of the cutting tip, the holding finger of the shank is axially pressed against the locking projection of the cutting tip.

4. The rotary cutting tool according to claim 3, wherein the clamping disc is positioned on a side of the cutting tip facing away from the holding finger and the clamping disc comprises at least one support geometry for positioning the cutting tip on the shank.

5. The rotary cutting tool according to claim 4, wherein a first support geometry facing the shank and a second support geometry facing the cutting tip are different.

6. The rotary cutting tool according to claim 3, wherein the clamping disc is a component separate from the shank and the cutting tip.

7. The rotary cutting tool of claim 3, wherein the rotary cutting tool comprises a drill.

8. A rotary cutting tool, comprising:
a shank having an axis of rotation;
an exchangeable cutting tip configured to be coupled to the shank,
wherein the shank includes a locking geometry comprising a base body extending axially along the axis of rotation and a holding finger extending from a cutting tip-side end of the base body in a circumferential direction relative to the base body, the holding finger having a projecting section forming a first undercut and a second undercut, the locking geometry further comprising a torque transmission geometry oriented in the direction of rotation and including a flat torque transmission surface and a curved torque transmission surface,
wherein the cutting tip includes a locking projection having a torque transmission counter-geometry comprising a flat torque transmission countersurface and a curved torque transmission countersurface,
wherein, in a mounted state, the locking projection of the cutting tip engages both the first undercut of the shank to prevent pull-out of the cutting tip from the shank along the axis of rotation and the second undercut of the shank to counteract rotation of the cutting tip relative to the shank in a direction of rotation and to counteract a lifting away of the torque transmission counter-geometry from the torque transmission geometry, and the torque transmission counter-geometry abuts the torque transmission geometry; and
a securing unit for holding the cutting tip on the shank, wherein the securing unit comprises a securing pin, and an opening associated with the securing pin is provided on the cutting tip, wherein the securing pin extends axially from the shank and, in the mounted state of the cutting tip, engages in the opening.

9. The rotary cutting tool according to claim 8, wherein the securing pin comprises a pin shank and a pin head and the opening is provided with a third undercut, wherein the third undercut acts axially and the pin head is disposed inside the opening in a first rotational position of the cutting tip relative to the securing pin and engages in the third undercut in order to secure the cutting tip against an axial pull-out direction on the shank.

10. The rotary cutting tool according to claim 9, wherein the pin head has an oval cross-section and the opening of the cutting tip comprises a feed section which is designed with a corresponding oval cross-section, so that the pin head is configured to be inserted axially into the opening in a second rotational position, wherein the second rotational position differs from the first rotational position.

11. The rotary cutting tool according to claim 8, wherein the securing pin consists of two securing pin halves which are separated by an axial gap, wherein the securing pin halves are elastically deformable in a radial direction.

12. The rotary cutting tool of claim 8, wherein the rotary cutting tool comprises a drill.

* * * * *